United States Patent
Nash et al.

(10) Patent No.: US 6,598,400 B2
(45) Date of Patent: Jul. 29, 2003

(54) GAS TURBINE WITH ARTICULATED HEAT RECOVERY HEAT EXCHANGER

(75) Inventors: James S. Nash, West Newbury, MA (US); James B. Kesseli, Greenland, NH (US); Andrew J. Olsen, Amesbury, MA (US)

(73) Assignee: Ingersoll-Rand Energy Systems Corporation, Portsmouth, NH (US)

( * ) Notice: Subject to any disclaimer, the term of this patent is extended or adjusted under 35 U.S.C. 154(b) by 0 days.

(21) Appl. No.: 09/968,297

(22) Filed: Oct. 1, 2001

(65) Prior Publication Data

US 2003/0061818 A1 Apr. 3, 2003

(51) Int. Cl.$^7$ ................................. F02C 7/10
(52) U.S. Cl. .................. 60/772; 60/784; 60/39.511; 165/DIG. 138
(58) Field of Search .............. 60/39.23, 39.511, 60/772, 783, 784, 785; 165/280, 283, 284, DIG. 138; 415/150

(56) References Cited

U.S. PATENT DOCUMENTS

| | | | |
|---|---|---|---|
| 2,147,283 A | * 2/1939 | Covell | 165/280 |
| 2,914,917 A | * 12/1959 | Van Nest | 60/39.511 |
| 2,994,509 A | * 8/1961 | Walker | 415/150 |
| 3,584,459 A | * 6/1971 | Amann | 60/39.23 |
| 6,484,799 B1 | * 11/2002 | Irish | 165/287 |

FOREIGN PATENT DOCUMENTS

| | | |
|---|---|---|
| DE | 27 33 931 | 2/1979 |
| DE | 195 41 889 A1 | 5/1997 |
| DE | 199 11 645 A1 | 9/2000 |
| FR | 2 616 212 A1 | 12/1988 |
| WO | WO 01/63175 | 8/2001 |

* cited by examiner

Primary Examiner—Louis J. Casaregola
(74) Attorney, Agent, or Firm—Michael Best & Friedrich LLP

(57) ABSTRACT

A cogenerating recuperated microturbine includes a recuperator, an air compressor and a combustor. The combustor burns a fuel along with the compressed air received from the recuperator to create products of combustion. A turbine generator operates in response to expansion of the products of combustion to generate electricity. The products of combustion then flow through the recuperator to preheat the compressed air. The products of combustion then flow out of the recuperator as an exhaust flow. A heat exchanger is movable into and out of the exhaust flow to selectively heat a fluid in the heat exchanger. The heat exchanger is actuated by a piston-cylinder type actuator that operates under the influence of compressed air selectively bled from the air compressor. The actuator may be a single-acting cylinder used in conjunction with a biasing spring, or may be a double-acting cylinder.

21 Claims, 5 Drawing Sheets

GAS TURBINE WITH ARTICULATED HEAT RECOVERY HEAT EXCHANGER

BACKGROUND OF THE INVENTION

The invention relates to an articulated heat recovery heat exchanger for use on a cogenerating recuperated microturbine to selectively heat a fluid.

SUMMARY

The present invention provides a cogenerating recuperated microturbine engine as well as a method for converting a recuperated microturbine into a cogenerating recuperated microturbine. The invention also provides an apparatus and method for selectively switching the cogenerating recuperated microturbine between a cogenerating mode and a non-cogenerating mode. The cogenerating recuperated microturbine engine has a recuperator with cells and spaces between the cells, an air compressor provides compressed air to the cells, and a combustor communicates with the cells to receive the compressed air. The combustor burns a fuel along with the compressed air to create products of combustion. A turbine generator communicates with the combustor and operates in response to expansion of the products of combustion to generate electricity. The products of combustion then flow through the turbine generator and into the spaces between the recuperator cells to preheat the compressed air. The products of combustion then flow out of an exhaust side of the recuperator as an exhaust flow. A heat exchanger is movable into and at least partially out of the exhaust flow to selectively heat a fluid in the heat exchanger.

The microturbine engine may also include an actuator operable to move the heat exchanger into and out of the exhaust flow. The actuator preferably operates in response to receiving compressed air from the compressor. A biasing member may bias the heat exchanger toward a position either into or at least partially out of the exhaust flow. The microturbine engine may also include an exhaust manifold that substantially covers the exhaust side of the recuperator and receives the exhaust flow. Preferably, the heat exchanger is located within the exhaust manifold. The exhaust manifold may include an intake port for receiving the exhaust flow such that the heat exchanger is movable between a first position where the heat exchanger substantially covers the intake port, and a second position where the intake port is substantially unobstructed.

The heat exchanger may be pivotally supported near the exhaust side such that it pivots into and out of the exhaust flow about a pivot axis. Preferably, the heat exchanger includes a fluid inlet coupling that has an inlet axis, and a fluid outlet coupling that has an outlet axis. The couplings are preferably configured such that the inlet and outlet axes are substantially collinear with the pivot axis. Generally, when the heat exchanger is moved into the exhaust flow, heat is transferred from the exhaust flow to the fluid, and when the heat exchanger is moved out of the exhaust flow, a reduced amount of heat is transferred from the exhaust flow to the fluid.

Other features and advantages of the invention will become apparent to those skilled in the art upon review of the following detailed description, claims, and drawings.

Figure 1:
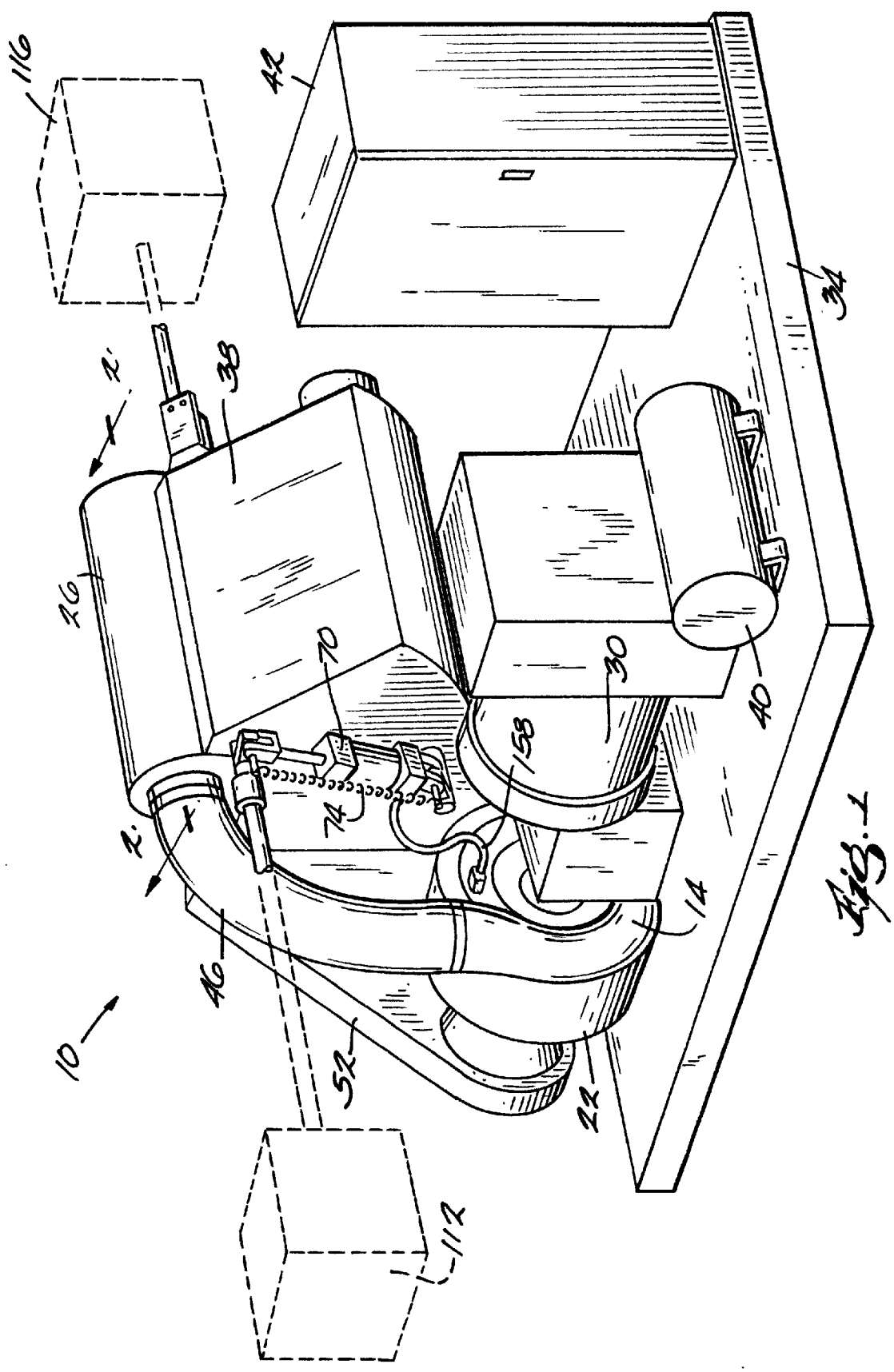
FIG. 1 is a perspective view of a cogenerating recuperated microturbine system embodying the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

For the sake of brevity, not all aspects of heat exchanger and microturbine combustor technology are discussed herein. For additional description of that technology, reference is made to U.S. patent application Ser. No. 09/790,464 filed Feb. 22, 2001, Ser. No. 09/668,358 filed Sep. 25, 2000, Ser. No. 09/409,641 filed Oct. 1, 1999, Ser. No. 09/239,647 filed Jan. 29, 1999 (now U.S. Pat. No. 5,983,992), and Ser. No. 08/792,261 filed Jan. 13, 1997. The entire contents of these applications are incorporated by reference herein.

FIG. 1 illustrates a microturbine system 10 including a compressor 14, a combustion section 18 (not shown in FIG. 1), a turbine 22, a recuperator 26, a generator 30, a frame 34, a heat recovery heat exchanger 38, and a fuel supply 40.

The frame 34 is constructed of steel or other known materials and should be capable of rigidly supporting the components of the system. The system 10 also includes an electrical cabinet 42 containing the system controls.

The generator 30 is attached to the frame 34 and is coupled to the turbine 22. When driven by the turbine 22, the generator 30 produces an electrical power output at a desired voltage and frequency. The system 10 can use many types of known generators 30, however permanent magnet generators are preferred. The choice of specific generators is based on the desired power output, the output characteristics (voltage and frequency), and the expected duty cycle of the equipment.

The compressor 14 is preferably a single stage radial flow compressor of known design, driven either directly or indirectly by the turbine 22. The compressor 14 pulls in atmospheric air along its central axis, and compresses the air to a pressure in the range of 3 to 5 atmospheres. From the compressor 14, the air flows through a duct 46 to the cold side of the recuperator 26.

Figure 2:
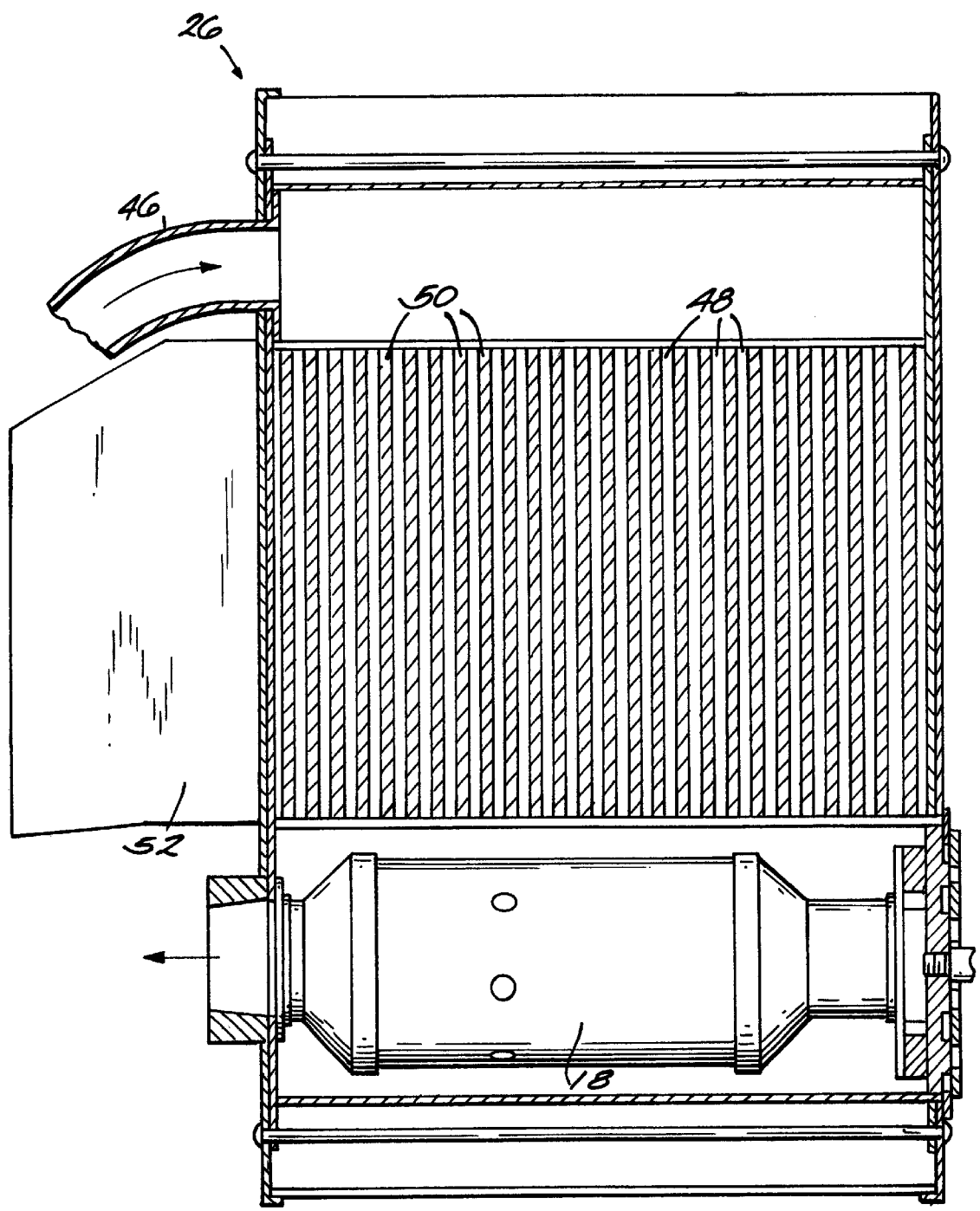
FIG. 2 is a section view taken along line 2—2 of FIG. 1.

Referring specifically to FIG. 2, the recuperator 26 is preferably a crossflow heat exchanger having a cold gas flow path defined by a series of cells 48 within the recuperator 26, and a hot gas flow path defined by the spaces 50 between the cells 48 of the recuperator 26. The hot gas flow path receives hot combustion gasses from the turbine 22 via a diffuser section 52 and discharges them to the heat recovery heat exchanger 38 (not shown in FIG. 2). The cold gas flow path receives compressed air from the compressor 14 via the duct 46. The compressed air is heated as it flows through the cells 48 of the recuperator 26, finally discharging into the combustion section 18. Preheating the combustion gas with the turbine exhaust gas before combustion results in a substantial efficiency improvement.

In the combustion section 18, air and fuel are mixed. Ignition of the fuel-air mixture within the combustion chamber produces an increase in temperature and gas volume. By controlling the fuel flow to the combustion section 18, the system 10 is capable of maintaining a desired power output and exhaust gas temperature. The hot exhaust gas exits the combustion section 18 and flows to the turbine 22.

Referring again to FIG. 1, in the turbine 22, the hot exhaust gas expands, rotating the turbine 22, which drives the compressor 14 and the generator 30. The turbine 22 is preferably a single stage radial flow turbine of known design capable of operating in the microturbine environment. The hot gas enters the turbine 22 at approximately 1700 F and exits at approximately 1200 F. This hot exhaust gas then flows through the diffuser section 52 to the recuperator 26.

As mentioned above, the exhaust gas exits the turbine 22 at approximately 1200 F. After passing through the recuperator 26, the exhaust gas has a temperature of approximately 420 F. This high temperature gas represents a substantial amount of thermal energy. Previously, microturbines simply discharged the exhaust gas into the atmosphere, wasting the associated thermal energy. The articulated heat recovery heat exchanger 38 provides a way to selectively heat water or other fluids by transferring a portion of the thermal energy from the hot exhaust gas to the fluid. The heated fluid may be used to heat potable water, or may be used in a hydronic heating system, for example. The microturbine therefore simultaneously generates two useful substances: electricity and heated fluid. This dual-purpose operating mode of the microturbine system 10 is termed cogeneration.

Figure 3:
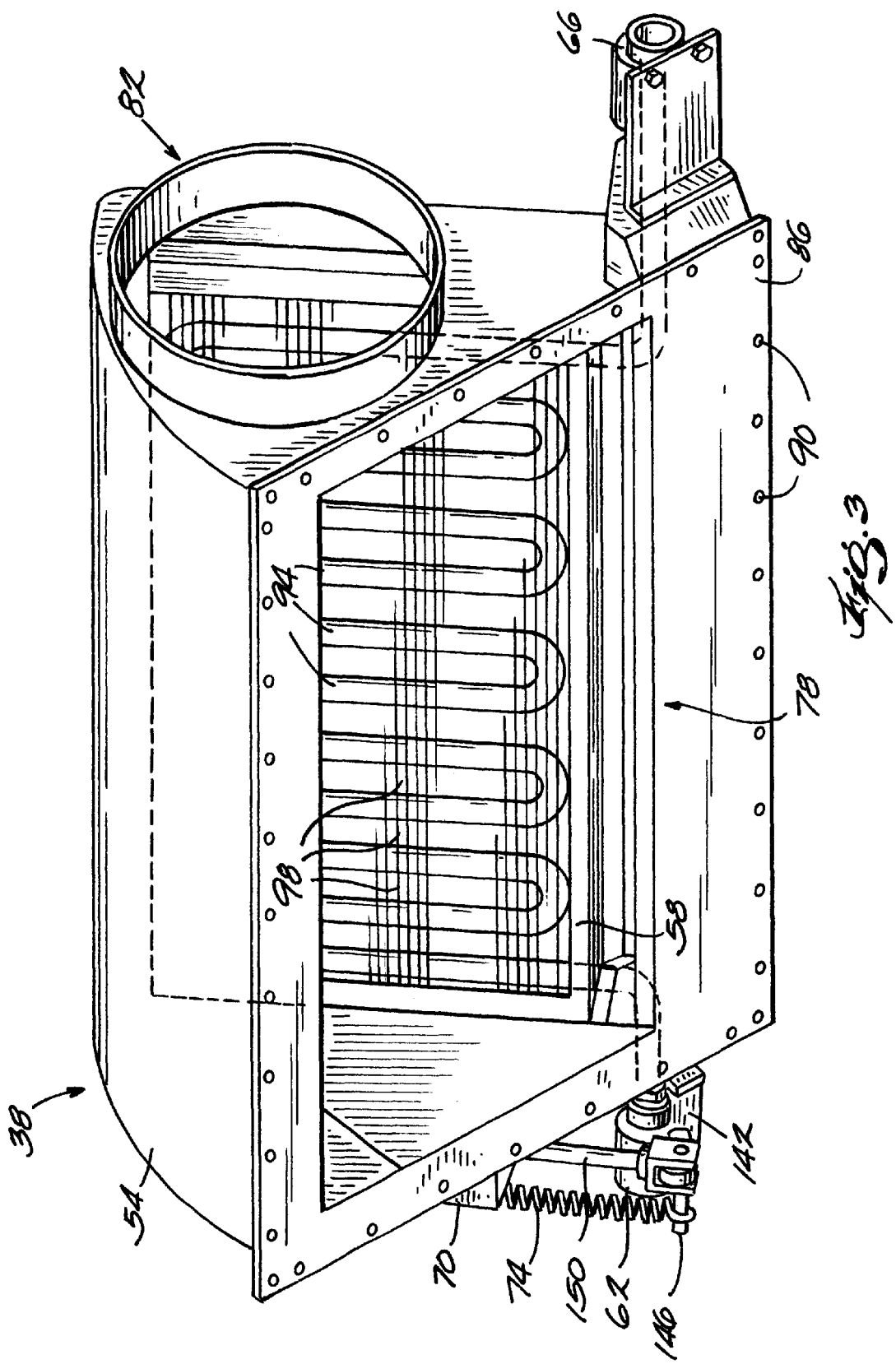
FIG. 3 is an enlarged perspective view of the articulated heat recovery heat exchanger.
Figure 4:
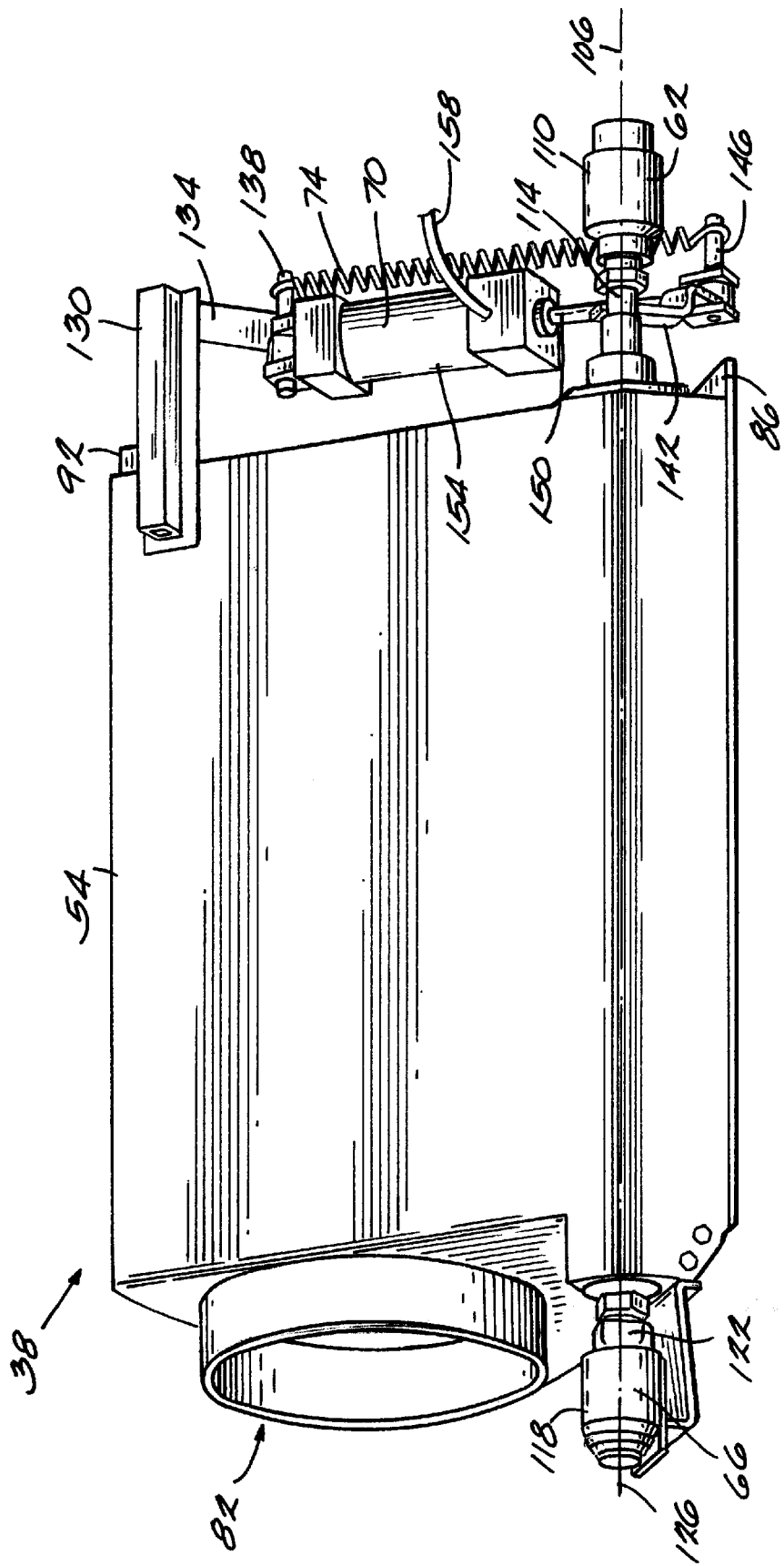
FIG. 4 is an enlarged perspective view of the articulated heat recovery heat exchanger.

Referring now to FIGS. 3 and 4, the articulated heat recovery heat exchanger 38 (sometimes referred to herein as the "recovery unit") includes an exhaust manifold or housing 54, a heat exchanger 58, a fluid inlet coupling 62, a fluid outlet coupling 66, an actuator 70, and a tension spring 74 or other suitable biasing member. The housing 54 defines an intake opening 78 and an exhaust opening 82 and conducts the exhaust gasses expelled by the recuperator 26 from the intake opening 78 to the exhaust opening 82 where they are routed through a venting system and released to the atmosphere. The housing 54 includes a flange portion 86 including a plurality of holes 90 that may be used to secure the recovery unit 38 to a side of the recuperator 26 using bolts, screws, or other known fasteners. The housing 54 also includes a fluid drain hole 92 for the drainage of water accumulating within the housing due to condensation on the outer surfaces of the heat exchanger 58.

The heat exchanger 58 is of the known tube-and-fin type although other types or styles of heat exchangers are possible. The heat exchanger 58 is pivotally mounted within the housing 54 in a manner described in more detail below. The heat exchanger 58 includes a series of tubes 94 extending across the length of the heat exchanger 58. The tubes 94 may be oriented in a generally serpentine fashion as illustrated in FIG. 3 or there may be multiple tubes 94 arranged in parallel extending from one end of the heat exchanger 58 to the other. The tubes 94 conduct fluid from one end of the heat exchanger 58 to the other, and are preferably made of aluminum, copper, stainless steel, or another suitable heat-conducting material. A plurality of fins 98 (drawn only partially in FIG. 3) extends between the tubes 94 to enhance the heat transfer capacity of the heat exchanger 58. The fins 98 are typically made of aluminum, copper, stainless steel, or another suitable heat-conducting material, and are brazed or otherwise thermally, structurally or metallurgically coupled to the tubes 94.

The fluid inlet coupling 62 defines a fluid inlet channel that has an inlet axis 106. The inlet coupling 62 also includes a fixed portion 110, communicating with a fluid source 112 (see FIG. 1), and a rotatable portion 114 communicating with the heat exchanger 58 and adapted to rotate about the inlet axis 106. Relatively cold fluid is received from the fluid source 112 and conducted through the fluid inlet channel into the tubes 94 of the heat exchanger 58. The fluid then flows through the tubes 94 of the heat exchanger 58 and exits the heat exchanger at the outlet coupling 66 and continues to a fluid receptacle 116 (e.g. a water heater tank or a hydronic heating system, see FIG. 1).

The outlet coupling 66 is similar to the inlet coupling and includes a fixed portion 118 mounted to the housing 54 and a rotatable portion 122 communicating with the heat exchanger 58. The rotatable portion 122 rotates about a fluid outlet axis 126 that is substantially collinear to the inlet axis 106. The couplings 62, 66 provide rotational motion about their respective axes 106, 126 while maintaining a fluid-tight seal between the heat exchanger 58 and the fluid source 112 and fluid receptacle 116. The inlet coupling 62 and the outlet coupling 66 also serve as bearings, pivotally supporting the heat exchanger 58 for pivotal movement about a pivot axis that is substantially collinear with the inlet and outlet axes 106, 126.

Figure 5:
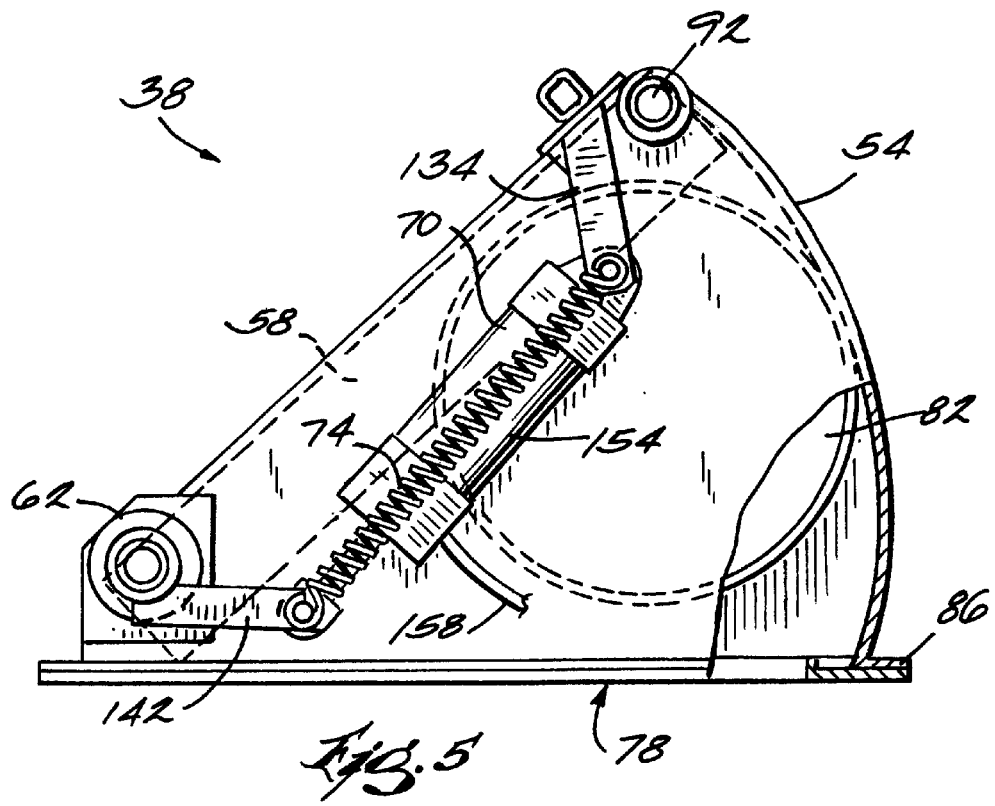
FIG. 5 is a side view of the articulated heat recovery heat exchanger in the non-cogenerating position.
Figure 6:
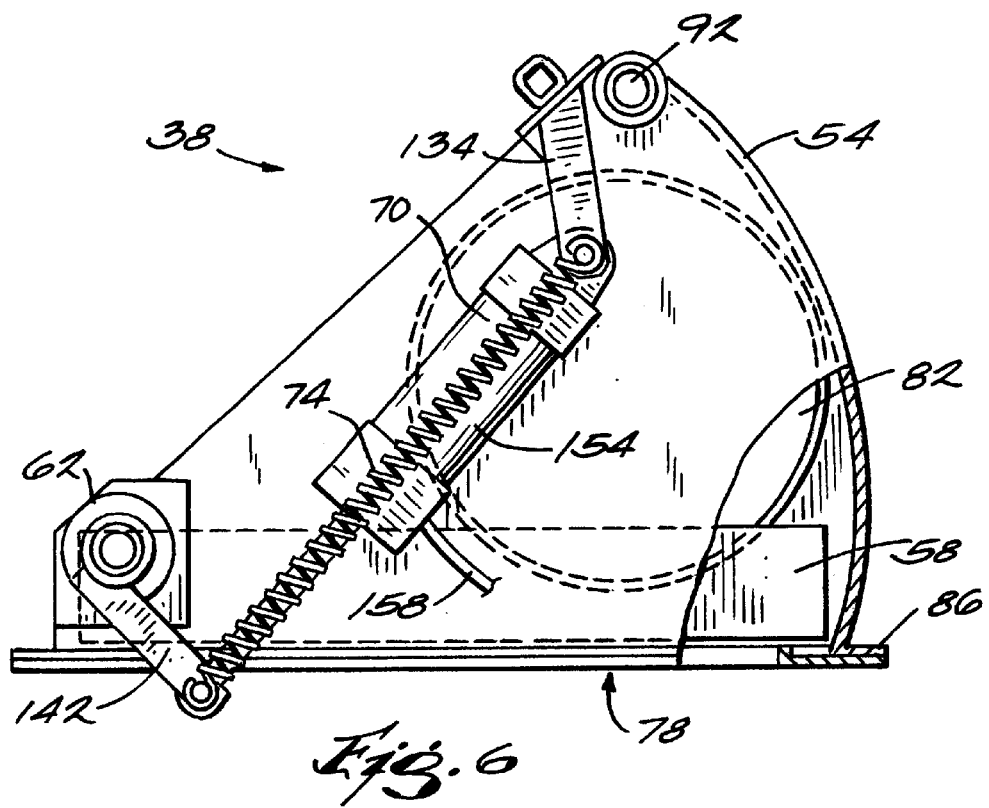
FIG. 6 is a side view of the articulated heat recovery heat exchanger in the cogenerating position.

Referring now also to FIGS. 5 and 6, the actuator 70 is mounted on one end to a fixed arm 130. The fixed arm 130 is mounted to the housing 54 by welding or other known fastening methods. The fixed arm 130 extends from one side of the housing 54 and includes a depending portion 134 to which the actuator 70 is pivotally mounted by a first pivot pin 138. The other end of the actuator 70 is pivotally mounted to an actuator arm 142 by a second pivot pin 146. The actuator arm 142 is fixed to the rotatable portion 114 of the inlet coupling 62. The illustrated actuator 70 is a piston-cylinder type actuator having a piston 150 and a cylinder 154, and is moveable between an extended position (FIG. 6) and a retracted position (FIG. 5). The tension spring 74 is interconnected between the first and second pivot pins 138, 146 and biases the actuator 70 toward the retracted position. The illustrated tension spring 74 is a helical spring, however other known springs such as elastic cords or bands are possible.

To move the actuator 70 to the extended position, compressed air is bled from the compressor 14 into the cylinder 154 of the actuator 70 by way of a high-pressure conduit 158. The pressure within the cylinder 154 creates a force on the piston 150 of the actuator 70 that overcomes the biasing force of the spring 74 and moves the actuator 70 toward the extended position. Once in the extended position, the pressure in the cylinder 154 is maintained, preventing the spring 74 from returning the actuator 70 to the retracted position. When it is desired to return the actuator 70 to the retracted position the compressed air is bled from the cylinder 154 and the force provided by the spring 74 moves the actuator 70 back toward the retracted position.

Because the actuator 70 is operated under the influence of the compressed air from the compressor 14, efficiency may be improved over systems using an external or dedicated electric motor to actuate the heat exchanger 58. More specifically, to actuate the heat exchanger 58, the illustrated construction requires only a small amount of electricity to intermittently actuate a solenoid that opens and closes a flow path for the compressed air to the cylinder 154. Once the flow path is pressurized by the compressed air, the compressor 14 will maintain such pressure continuously until the solenoid closes the flow path. By contrast, a system using an electric motor would have to constantly supply electricity to the motor to operate against the bias of the spring 74.

The heat exchanger 58 is movable between a non-cogenerating, disengaged position (FIG. 5) and a cogenerating, engaged position (FIG. 6). In the disengaged position, the heat exchanger 58 is positioned substantially adjacent one of the walls of the housing 54, allowing the exhaust gasses to enter the housing at the intake opening 78 and flow substantially unrestricted out of the housing 54 through the exhaust opening 82. When the heat exchanger 58 is in the disengaged position, very little exhaust gas flows across the tubes 94 and fins 98 of the heat exchanger 58, as a result, very little heat is transferred from the exhaust gasses to the fluid flowing through the heat exchanger 58.

When it is desired to heat the fluid flowing through the heat exchanger 58, air is bled from the compressor 14 to move the actuator 70 toward the extended position as described above. Moving the actuator 70 toward the extended position pivots the heat exchanger 58 by way of the actuator arm 142, and positions the heat exchanger 58 in the engaged position where it substantially covers the intake opening 78. When the heat exchanger 58 is in the engaged position, substantially all of the exhaust gasses flow across the tubes 94 and fins 98 of the heat exchanger 58, transferring a maximum amount of heat from the exhaust gasses to the fluid flowing through the heat exchanger 58. After passing through the heat exchanger 58, the exhaust gasses exit the housing 54 through the exhaust opening 82. When it is no longer desired to heat the fluid flowing through the heat exchanger 58, the compressed air is bled from the cylinder 154 of the actuator 70 as described above, the spring 74 then returns the actuator 70 to the retracted position, thus returning the heat exchanger 58 to the disengaged position.

It should be apparent that the operation of the spring 74 and actuator 70 may be reversed such that the spring 74 biases the heat exchanger 58 toward the engaged position and the actuator 70 is used to move the heat exchanger 58 to the disengaged position. Alternatively, a dual-action actuator may be used that is capable of positively moving the heat exchanger 58 toward either position, thus eliminating the need for the spring 74.

What is claimed is:

1. A recuperated microturbine engine comprising:
   a recuperator having cells, and spaces between said cells;
   an air compressor providing compressed air to said cells of said recuperator;
   a combustor communicating with said cells to receive compressed air therefrom, said combustor burning a fuel with said compressed air to create products of combustion;
   a turbine generator communicating with said combustor and operating in response to expansion of said products of combustion to generate electricity, said products of combustion flowing through said turbine generator and into said spaces between said recuperator cells to preheat the compressed air, the products of combustion flowing out of said recuperator on an exhaust side thereof as an exhaust flow;
   a heat exchanger movable into and at least partially out of said exhaust flow to selectively heat a fluid in said heat exchanger.

2. The microturbine engine of claim 1, further comprising an actuator, said actuator operable to move said heat exchanger into and out of said exhaust flow.

3. The microturbine engine of claim 2, wherein said actuator operates in response to selectively receiving compressed air from said compressor.

4. The microturbine engine of claim 1, wherein said heat exchanger is in a first position when in said exhaust flow, and is in a second position when at least partially out of said exhaust flow, said engine further comprising a biasing member biasing said heat exchanger toward one of said first and second positions.

5. The microturbine engine of claim 1, further comprising an exhaust manifold substantially covering said exhaust side of said recuperator and receiving said exhaust flow from said exhaust side of said recuperator, wherein said heat exchanger is within said exhaust manifold.

6. The microturbine engine of claim 5, wherein said exhaust manifold includes an intake port for receiving said exhaust flow, wherein said heat exchanger is movable between first and second positions, said heat exchanger substantially covering said intake port when in said first position, and wherein said intake port is substantially unobstructed when said heat exchanger is in said second position.

7. The microturbine engine of claim 1, wherein said heat exchanger is pivotally supported near said exhaust side for pivotal movement into and out of said exhaust flow.

8. The microturbine engine of claim 7, wherein said heat exchanger pivots about a pivot axis, wherein said heat exchanger includes a fluid inlet coupling having an inlet axis, and a fluid outlet coupling having an outlet axis, and wherein said inlet and outlet axes are substantially collinear with said pivot axis.

9. The microturbine engine of claim 1, wherein when said heat exchanger is moved into said exhaust flow, heat is transferred from said exhaust flow to the fluid, and wherein when said heat exchanger is moved out of said exhaust flow, a reduced amount of heat is transferred from said exhaust flow to the fluid.

10. A cogeneration apparatus for generating electricity and selectively heating a fluid, said apparatus comprising:
    a recuperated microturbine engine, the microturbine engine burning a mixture of compressed air and fuel to create products of combustion, expanding the products of combustion in a turbine to produce an exhaust flow, pre-heating the compressed air with the exhaust flow in a recuperator, and expelling the exhaust flow through an exhaust port;
    an exhaust manifold communicating with said exhaust port for conducting the exhaust flow therethrough; and
    a heat exchanger mounted within said manifold and movable between an obstructed flow position wherein the exhaust flow passes through said heat exchanger to transfer heat to the fluid, and an unobstructed flow position wherein a reduced amount of the exhaust flow passes through said heat exchanger and wherein a reduced amount of heat is transferred from the exhaust flow to the fluid.

11. The apparatus of claim 10, further comprising an actuator operable to move said heat exchanger between said obstructed flow and said unobstructed flow positions.

12. The apparatus of claim 10, further comprising a biasing member, biasing said heat exchanger toward one of said obstructed flow position and said unobstructed flow position.

13. The apparatus of claim 10, wherein said heat exchanger is pivotally mounted to said manifold for pivotal movement about a pivot axis.

14. The apparatus of claim 13, wherein said heat exchanger includes a fluid cell, said apparatus further comprising a fluid channel defining a flow axis and communicating with said fluid cell, wherein said flow axis is substantially collinear with said pivot axis.

15. The apparatus of claim 10, wherein when said heat exchanger is in said obstructed flow position, said heat exchanger substantially covers said exhaust port.

16. A method for converting a microturbine system having an exhaust flow into a cogenerating microturbine system for generating electricity and selectively heating a fluid, the method comprising:

provide a heat exchanger assembly with a movable heat exchanger portion;

positioning the heat exchanger assembly on the microturbine with the heat exchanger portion substantially out of the exhaust flow;

moving the heat exchanger portion to a position substantially in the exhaust flow;

conducting a fluid through the heat exchanger portion; and heating the fluid in the heat exchanger portion with the exhaust flow.

17. The method of claim 16, further comprising providing an exhaust manifold for receiving the exhaust flow from the microturbine system and positioning the heat exchanger within the exhaust manifold.

18. The method of claim 16, wherein the microturbine system creates a flow of compressed air, the method further comprising providing an actuator and coupling the actuator to the heat exchanger portion, wherein moving the heat exchanger portion comprises operating the actuator in response to the flow of compressed air.

19. The method of claim 16, wherein moving the heat exchanger portion comprises pivoting the heat exchanger portion about a pivot axis.

20. A method for moving a movable portion of a cogenerating recuperated microturbine system having a compressor providing compressed air, the method comprising:

providing an actuator having first and second ends and an inner chamber between the first and second ends, the actuator being operable in response to the introduction of compressed air to the inner chamber;

coupling the first end of the actuator to a fixed portion of the microturbine system;

coupling the second end of the actuator to the movable portion of the microturbine system; and introducing compressed air from the compressor into the inner chamber of the actuator to actuate the actuator and move the movable portion of the microturbine system;

wherein the movable portion includes a heat exchanger having a fluid therewithin, and wherein the act of introducing includes moving the heat exchanger into and at least partially out of an exhaust flow under the influence of the actuator to selectively heat the fluid with the exhaust flow.

21. The method of claim 20, wherein the microturbine system includes a recuperator, an air compressor, a combustor, and a turbine/generator assembly, the air compressor producing compressed air, the combustor burning the compressed air with a fuel to produce products of combustion, the turbine/generator assembly operating in response to expansion of the products of combustion to produce electricity and to create an exhaust flow, and the recuperator preheating the compressed air with heat from the exhaust flow prior to the compressed air reaching the combustor, wherein the act of introducing includes channeling compressed air from the air compressor to the inner chamber.

* * * * *